United States Patent [19]

Taylor

[11] Patent Number: 4,561,826
[45] Date of Patent: Dec. 31, 1985

[54] VERTICAL AXIS WIND TURBINES

[76] Inventor: Derek A. Taylor, 85 Waterside, Peartree Bridge, Milton Keynes, England

[21] Appl. No.: 475,471

[22] Filed: Mar. 10, 1983

[51] Int. Cl.[4] ............................................. F03D 3/06
[52] U.S. Cl. ...................................... 416/19; 416/87; 416/117; 416/132 B
[58] Field of Search ............... 416/19, 102, 148, 89 A, 416/87, 117, DIG. 8, 132 B

[56] References Cited

U.S. PATENT DOCUMENTS

| | | | |
|---|---|---|---|
| 1,786,057 | 12/1930 | Faley | 416/19 |
| 1,802,094 | 4/1931 | Stuart | 416/19 X |
| 2,605,093 | 7/1952 | Dorand | 416/31 X |
| 4,024,409 | 5/1977 | Payne | 416/37 X |
| 4,050,246 | 9/1977 | Bourquardez | 416/132 B X |
| 4,087,202 | 5/1978 | Musgrove | 416/41 |
| 4,168,439 | 9/1979 | Palma | 416/DIG. 4 X |
| 4,264,279 | 4/1981 | Dereng | 416/227 A |
| 4,325,674 | 4/1982 | Ljungstrom | 416/227 A X |
| 4,329,116 | 5/1982 | Ljungstrom | 416/19 |
| 4,334,823 | 6/1982 | Sharp | 416/119 |
| 4,355,956 | 10/1982 | Ringrose et al. | 416/119 X |

FOREIGN PATENT DOCUMENTS

| | | | |
|---|---|---|---|
| 883429 | 7/1953 | Fed. Rep. of Germany | 416/DIG. 4 |
| 2298707 | 8/1976 | France | 416/227 A |
| 2472677 | 7/1981 | France | 416/203 A |

*Primary Examiner*—Everette A. Powell, Jr.
*Attorney, Agent, or Firm*—Young & Thompson

[57] ABSTRACT

A vertical axis wind turbine has one or more blades (10) mounted in cantilever manner on a hub (12) on a short tower (14). The or each blade (10) is unsupported above the level of the hub (12) and extends freely upwards. The hub (12) may be a rigid mounting or a pivot mounting. If two blades (10) are used, they are desirably arranged in a crossed configuration so as to extend along a common axis. The upward arm of the blade (10) can be straight and rigid, or flexible, or cranked, or curved. The wind turbine is suitable both for land-based use and on water-going craft.

12 Claims, 17 Drawing Figures

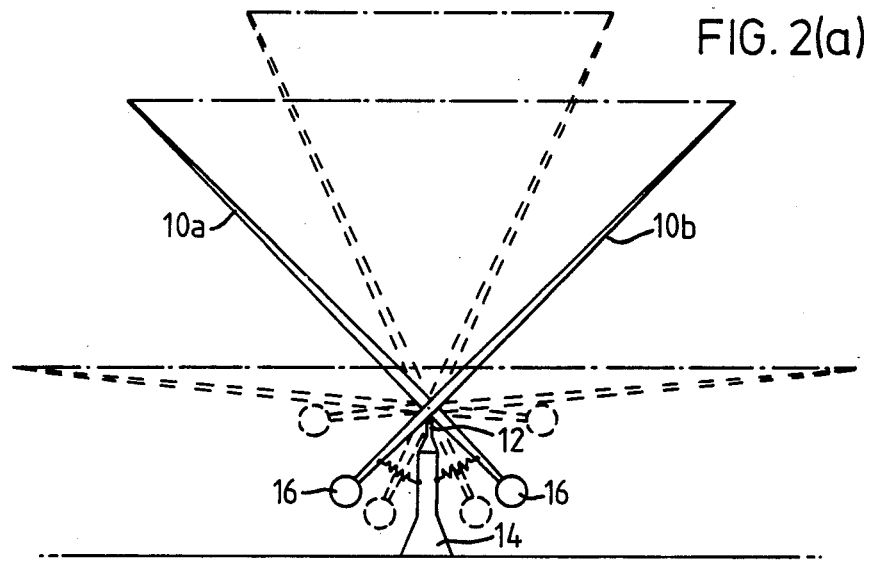
FIG. 2(a)
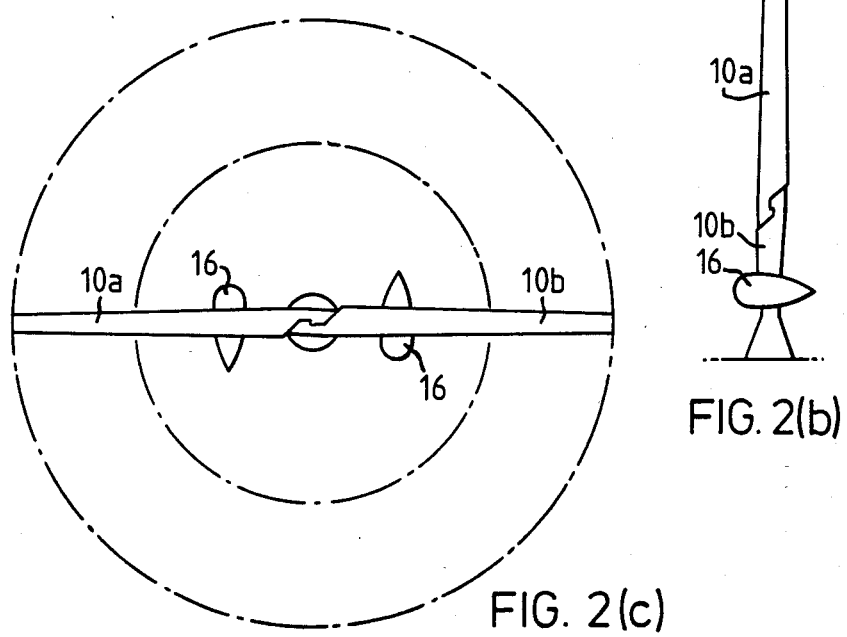
FIG. 2(b)
FIG. 2(c)

VERTICAL AXIS WIND TURBINES

This invention relates to vertical axis wind turbines.

Various different types of vertical axis wind turbine are already known, including those of the Darrieus type with symmetrical airfoil blades arranged around a central mast or tower.

In accordance with the present invention there is provided a vertical axis wind turbine comprising one or more blades mounted in cantilever manner on a hub, with the or each blade being without support above the level of the hub and having at least one arm extending freely upwards in an inclined manner from the hub.

The blade or blades can be of either fixed or variable pitch.

Although the single blade version of the wind turbine is presently preferred, for reasons of simplicity and ease of construction, multiple blade turbines may alternatively be used within the scope of the invention.

The single cantilevered blade wind turbine in accordance with the invention, mounted on a rigid hub, performs in generally the same manner as the Darrieus type of vertical turbine with symmetrical airfoil blades, but unlike such conventional wind turbines does not require blade support arms or long shafts with top bearings.

The single cantilevered blade version of the wind turbine of the present invention, with a pivot hub mounting, additionally gives a variable solidity and variable geometry configuration which improves the control of the wind turbine. This means that one has an improved starting capability when the blade is only a few degrees off vertical. As the wind speed approaches the optimum level, the blade is progressively moved to a more inclined operating position automatically by centrifugal force acting against a spring. In winds which are stronger than the optimum level, the blade is further inclined towards the horizontal so that the swept volume is considerably reduced in order to minimise bending stresses in the structure.

The cantilevered blade wind turbine of the present invention has a number of advantages, both in comparison with horizontal axis wind turbines and in comparison with other known vertical axis wind turbines.

Firstly, the wind turbine of the present invention does not need to be directed into the wind, unlike horizontal axis wind turbines, which means that one does not need to provide a system which will compensate for yaw, thus considerably reducing the cost. Moreover, unlike horizontal axis wind turbines, the wind turbine of the present invention experiences no gyroscopic or fluctuating gravitational loads, which means that comparatively lightweight blades can be used, again with cost savings.

In the case of wind turbines of the present invention which have the blade or blades mounted on a pivot hub, the variable solidity, variable geometry configuration is self-starting and inherently self-regulating in high winds, thus reducing bending stresses and enabling one to use lighter, and hence cheaper, blades.

With the cantilevered blade wind turbine of the present invention one can use very simple straight untwisted blades, thereby again reducing construction costs. Existing helicopter and horizontal axis wind turbine blade and hub technology can also be used.

One of the major problems of conventional wind turbines is the need to build a very tall tower on which to mount the blade system. With the wind turbine of the present invention much shorter towers can be used than for conventional wind turbines. As the cost of the tower can amount to as much as 30% of the total cost of the installation, a considerable capital cost saving can therefore be achieved.

A further important advantage of the wind turbine of the present invention is that for a given swept volume the amount of blade material which is required is much less than with existing types of vertical axis wind turbine, again resulting in lower blade costs.

Because with the construction according to the present invention the tower which carries the hub on which the blade or blades is/are mounted does not intrude into the swept volume, the tower does not cause any turbulence on the downward portion of the rotational path of the blade or blades. Such turbulence can result in a considerable loss of efficiency. The improved construction of the wind turbine of the present invention can result in a correspondingly higher efficiency, particularly as the or each blade crosses the swept volume twice in each rotational cycle. This further improves the blade material/swept volume ratio.

In order that the invention may be fully understood, a number of embodiments of vertical axis wind turbine in accordance with the invention will now be described by way of example and with reference to the accompanying schematic drawings, in which:

FIGS. 2a, 2b and 2c are front, side and plan views respectively of a second embodiment of wind turbine in accordance with the invention, comprising two cantilevered blades mounted on a pivot hub;

Figure 1A:
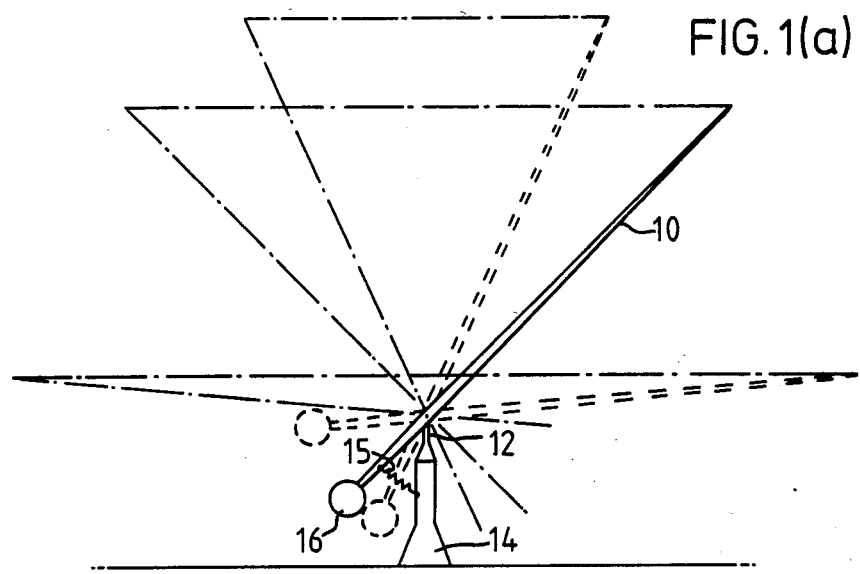
FIGS. 1a, 1b and 1c are front, side and plan views respectively of a first embodiment of vertical axis wind turbine in accordance with the invention, comprising a single cantilevered blade mounted on a pivot hub.
Figure 1B:
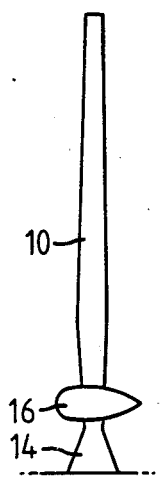
Figure 1C:
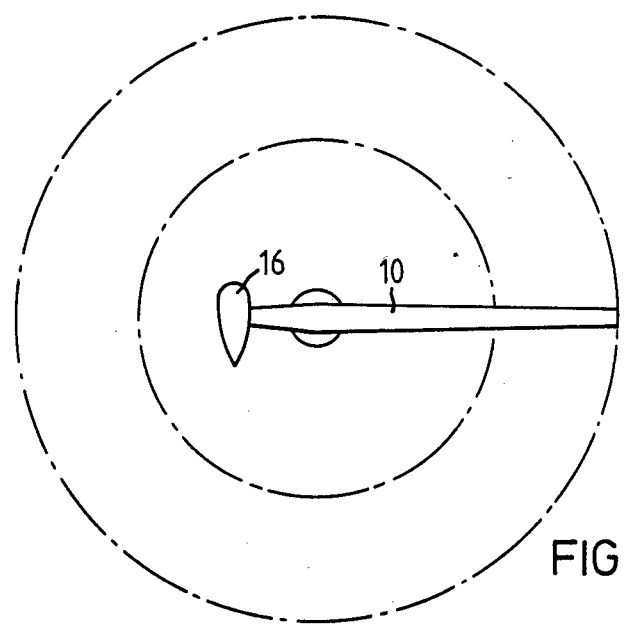

Referring first to FIGS. 1a to 1c, these show a single cantilevered blade 10 mounted on a pivot hub 12 at the top of a tower 14. The end of the short arm of the blade 10 is provided with a counterweight 16. The blade can be of fixed pitch or variable pitch. A spring 15 is connected between the tower and the shorter arm of the blade to counter the centrifugal force which is generated as the blade is rotated around the pivot hub by the wind. It will be appreciated that the blade is without support above the level of the hub, and that the arm extends freely upwards in an inclined manner from the hub. The drawing also illustrates how in this embodiment the volume swept out by the blade 10 changes as the wind speed increases. In other words, as the wind speed increases, so the blade 10 is moved progressively downwards towards a generally horizontal position, thus reducing the volume swept out by the longer arm of the rotating blade, here indicated by chain-dotted lines. It will be appreciated from the drawing that the tower 14 does not intrude into the volume swept out by the blade 10 and that a relatively short tower in comparison with the length of the blade can be used.

In FIGS. 2a to 2c, a pair of cantilever blades 10a and 10b are mounted on a pivot hub 12 on a tower 14. Each blade is provided with its own counterweight 16. This arrangement is essentially just a doubling up of the arrangement shown in FIG. 1. The two blades are each provided with a recessed region adjacent to their crossing point so that they lie in a common plane, as shown in FIGS. 2b and 2c.

Figure 3A:
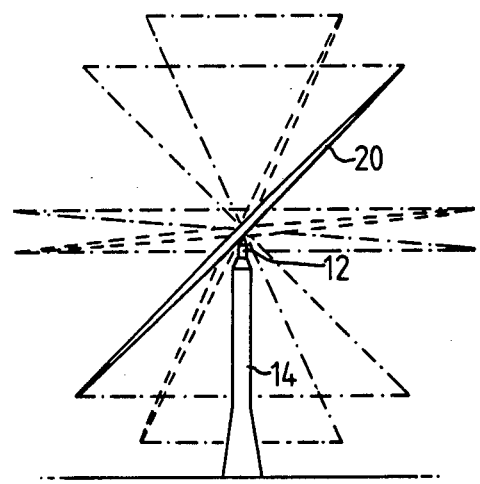
FIGS. 3a, 3b and 3c are front, side and plan views respectively of a third embodiment of wind turbine in accordance with the invention, comprising a single double-arm blade mounted as a beam on a pivot hub.
Figure 3B:
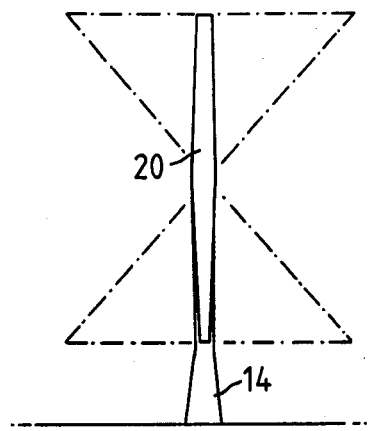
Figure 3C:
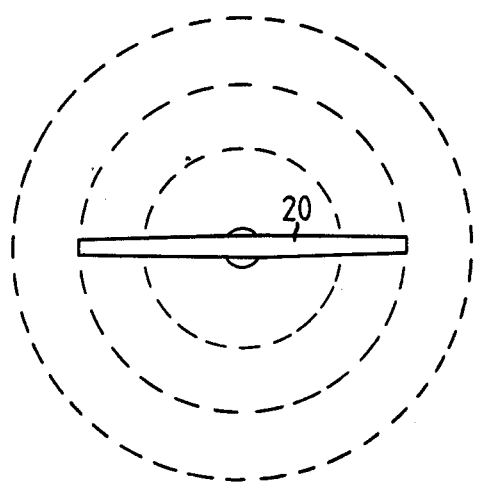

FIGS. 3a to 3c show an arrangement in which a single blade 20 is provided on the pivot hub 12 on the tower 14. The blade 20 in this case is formed as a double-armed beam which is pivoted at its centre. It is of course necessary in this arrangement that the tower is considerably taller than that used in the preceding embodiments. The swept volume is again indicated by chain-dotted lines and is here in the form of a double cone.

Figure 4A:
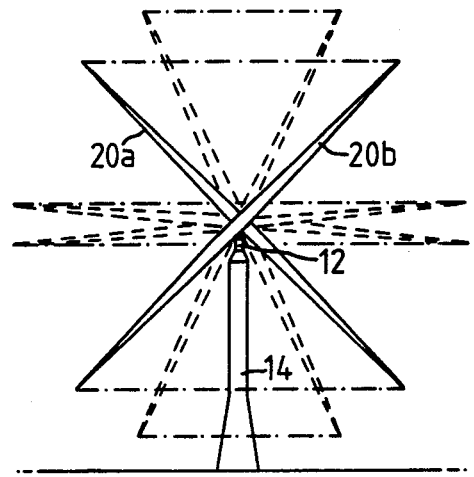
FIGS. 4a, 4b and 4c are front, side and plan views respectively of a fourth embodiment of wind turbine in accordance with the invention, comprising two double-arm blades mounted in an X-configuration on a pivot hub.
Figure 4B:
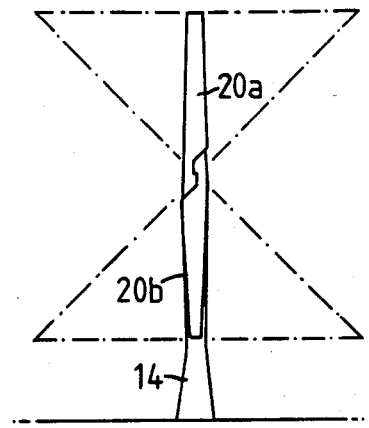
Figure 4C:
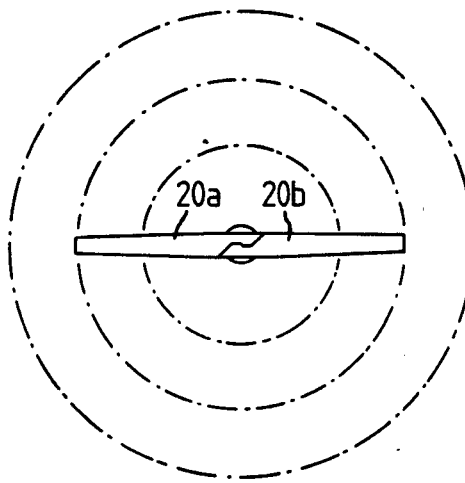

FIGS. 4a to 4c show an arrangement which is essentially a doubling up of the construction shown in FIGS. 3a to 3c, in which a pair of blades 20a and 20b are mounted in an X-configuration on the pivot hub 12, with the blades lying in a common plane.

Reference is now made to the alternative constructions shown in FIGS. 5 to 8. In each of these schematic diagrams the blade or blades are shown mounted on a rigid hub. However, it should be appreciated that in every case the blade or blades could alternatively be mounted on a pivot hub, generally with some advantage, in that one thereby achieves a variable solidity and variable geometry configuration which improves the control of the wind turbine and improves both its starting and running capabilities.

Figure 5:
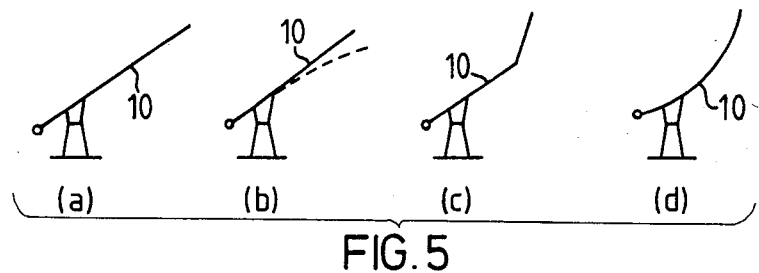
FIGS. 5a to 5d show alternative configurations of wind turbine in accordance with the invention using a single blade mounted on a fixed hub.

FIG. 5 shows variations of the arrangement of FIG. 1. FIG. 5a shows the use of a straight blade 10. FIG. 5b shows the use of a flexing blade 10 which enables one to achieve some degree of variable geometry. FIG. 5c shows a cranked blade 10. FIG. 5d shows the use of a curved blade 10.

Figure 6:
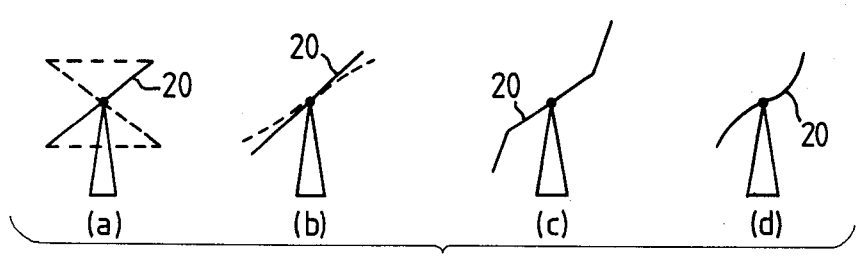
FIGS. 6a to 6d show alternative constructions of wind turbine in accordance with the invention incorporating a single double-arm blade mounted on a fixed hub.

In FIG. 6 various types of double-arm beam-balance blade are shown, based on FIG. 3. FIG. 6a corresponds generally to FIG. 3. FIG. 6b shows the use of a flexing blade 20. FIG. 6c shows the use of a cranked blade 20. FIG. 6d shows the use of a curved blade 20 of generally S-shape.

Figure 7:
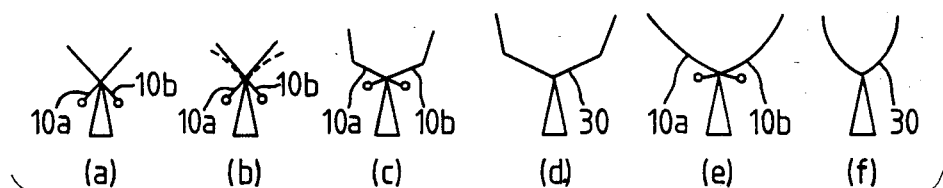
FIGS. 7a to 7f show further configurations of wind turbine in accordance with the invention, each comprising two blades mounted on a fixed hub.

FIG. 7 shows various embodiments of double-blade wind turbine with the two blades in U-shaped, V-shaped or scissors configurations. FIG. 7a corresponds generally to FIG. 2. FIG. 7b shows the use of flexing blades 10a, 10b arranged in scissors configuration. FIG. 7c shows the use of two cranked blades 10a, 10b. FIG. 7d shows the use of one continuous cranked blade 30 of generally U-shaped configuration. FIG. 7e shows the use of two curved blades 10a, 10b, and FIG. 7f shows the use of a continuous curved blade 30 of generally U-shaped configuration.

Figure 8:
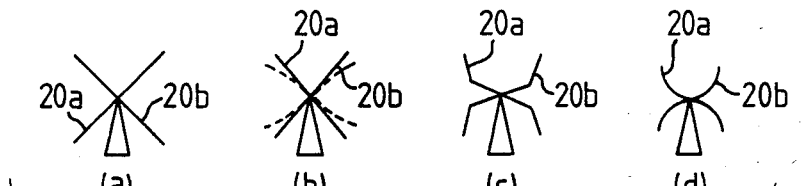
FIGS. 8a to 8d show yet further constructions of wind turbine in accordance with the invention, each comprising multiple blades of generally X-shaped configuration and mounted on a fixed hub; and, FIG. 9 is a schematic illustration of the application of the wind turbine of the present invention to a ship for propulsion.

The embodiments shown in FIG. 8 show alternative arrangements for two blades arranged in an X-configuration. FIG. 8a corresponds generally to FIG. 4. FIG. 8b shows the use of flexing blades 20a, 20b; FIG. 8c shows the use of two cranked blades 20a, 20b and FIG. 8d shows the use of two curved blades 20a, 20b.

In addition to being able to provide power for land-based needs the vertical axis wind turbine of the present invention can be used to propel many kinds of boats and ships, either as the main form of propulsion or, as is more likely, in the cargo-carrying fleets, as a fuel-saving mechanism that can operate in parallel with conventional engines.

Either by generating electricity and driving water-screws electrically, or by direct mechanical drive, it is possible to propel a ship in any direction regardless of the direction of wind, and even directly into the wind.

Figure 9:
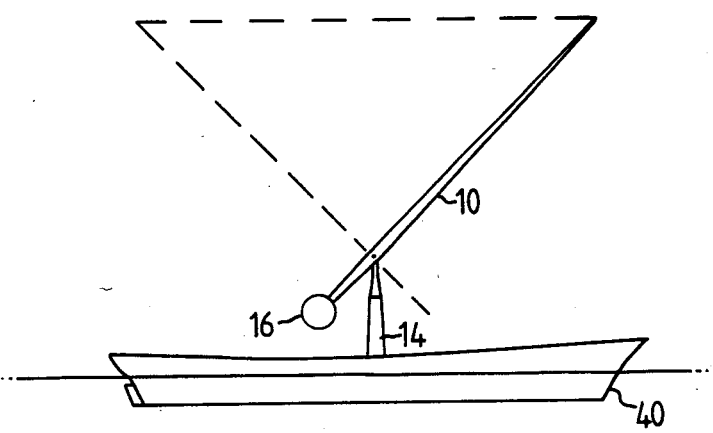

FIG. 9 illustrates the mounting of a wind turbine of the present invention on a ship 40.

All the advantages of the wind turbine outlined for its land-based mode also apply in marine propulsion, i.e. omnidirectional operation, relatively short mast and stress-relieving action due to an inclining blade or blades. In addition, the vertical axis configuration may also provide direct thrust in an "autogyro" mode so that it can also operate similarly to a conventional sailing ship.

I claim:

1. A vertical axis wind turbine comprising a support tower, at least one blade mounted in cantilever manner on a pivot hub at the top of said support tower, said at least one blade being without support above the level of the pivot hub and having a blade arm extending freely upward in an inclined manner from the pivot hub, mounting means supporting said at least one blade both for rotation about the vertical axis of the support tower to sweep out a generally conical volume above the tower and also simultaneously for pivoting movement about a horizontal axis passing through said vertical axis such that with increasing wind speed the inclination of the longitudinal axis of the blade arm to said vertical axis of the support tower will increase, said mounting means allowing changes in the inclination of said at least one blade under the action of centrifugal force, and resilient biasing means acting in opposition to the centrifugal forces to control the inclination of said at least one blade in dependence on changes in wind speed.

2. A vertical axis wind turbine as claimed in claim 1, in which said at least one blade is of fixed pitch.

3. A vertical axis wind turbine as claimed in claim 1, which comprises a blade having a long arm projecting upwardly from the hub and a relatively short counter-balanced arm extending below the level of the hub.

4. A vertical axis wind turbine as claimed in claim 3, which comprises a second such blade, with the two blades arranged in a crossed configuration so as to extend along a common axis.

5. A vertical axis wind turbine as claimed in claim 1, which comprises a double-armed blade mounted as a balanced beam on the hub.

6. A vertical axis wind turbine as claimed in claim 5, in which the arms of the blade are of equal length.

7. A vertical axis wind turbine as claimed in claim 5, which comprises a second such blade, with the two blades arranged in a crossed configuration so as to extend along a common axis.

8. A vertical axis wind turbine as claimed in claim 1, in which said at least one blade is capable of flexing movement.

9. A vertical axis wind turbine as claimed in claim 1, in which said at least one blade is cranked above the level of the hub.

10. A vertical axis wind turbine as claimed in claim 1, in which said at least one blade is curved from the hub mounting towards the upward free end.

11. A vertical axis wind turbine as claimed in claim 1, in which the hub is mounted on a tower, and in which the tower does not intrude into the swept volume of the blade or blades.

12. A vertical axis wind turbine comprising a support tower defining a vertical axis of rotation, at least one blade mounted directly on a pivot hub at the top of said tower, said at least one blade extending upwardly from the hub in an inclined manner away from the axis of rotation, and mounting means supporting said at least one blade so that it is both rotatable about the vertical axis and also simultaneously pivotable about a horizontal axis passing through the vertical axis, said at least one blade operating on aerodynamic lift principles, the rotating path of each portion of said at least one blade being a circle the plane of which is horizontal and the center of which lies on said vertical axis, and resilient biasing means acting on said at least one blade in opposition to centrifugal force to control the inclination of said at least one blade about said horizontal axis in dependence on changes in wind speed.

* * * * *